May 16, 1944.  G. T. RANDOL  2,348,753
CHANGE SPEED TRANSMISSION
Filed Dec. 28, 1940  3 Sheets-Sheet 1
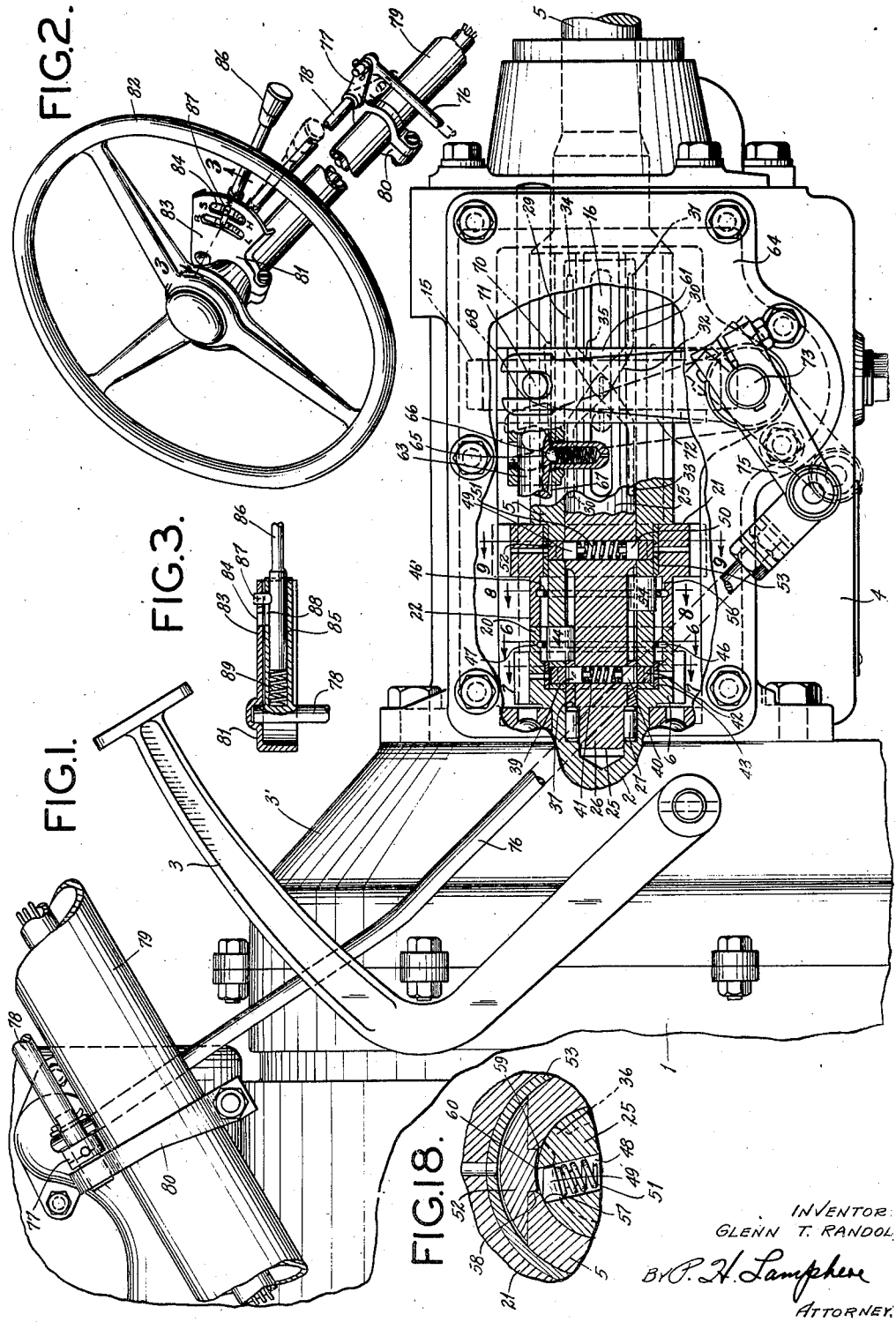
INVENTOR
GLENN T. RANDOL
BY P. H. Lamphere
ATTORNEY.

May 16, 1944.  G. T. RANDOL  2,348,753
CHANGE SPEED TRANSMISSION
Filed Dec. 28, 1940  3 Sheets-Sheet 2
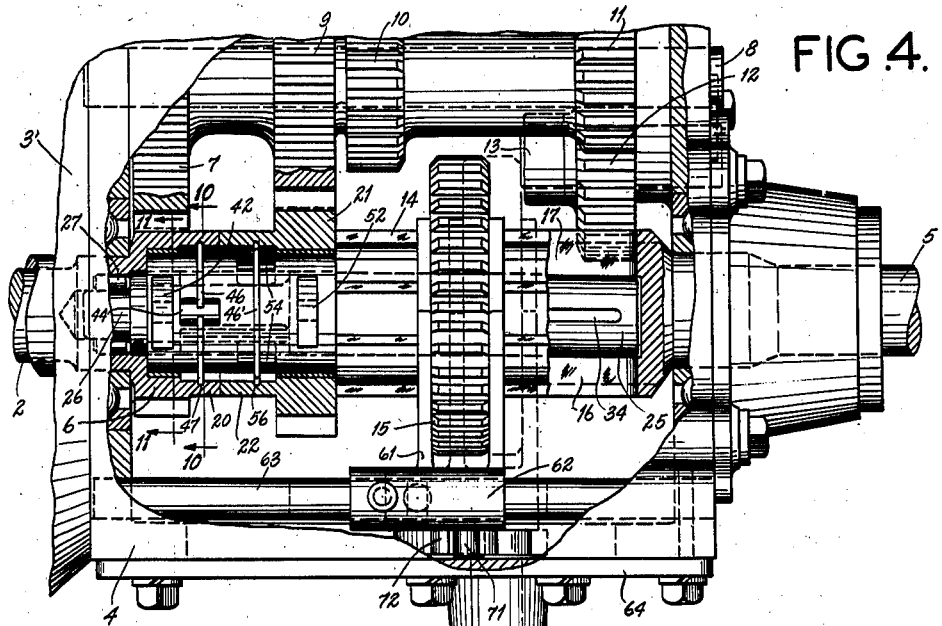
FIG. 4.
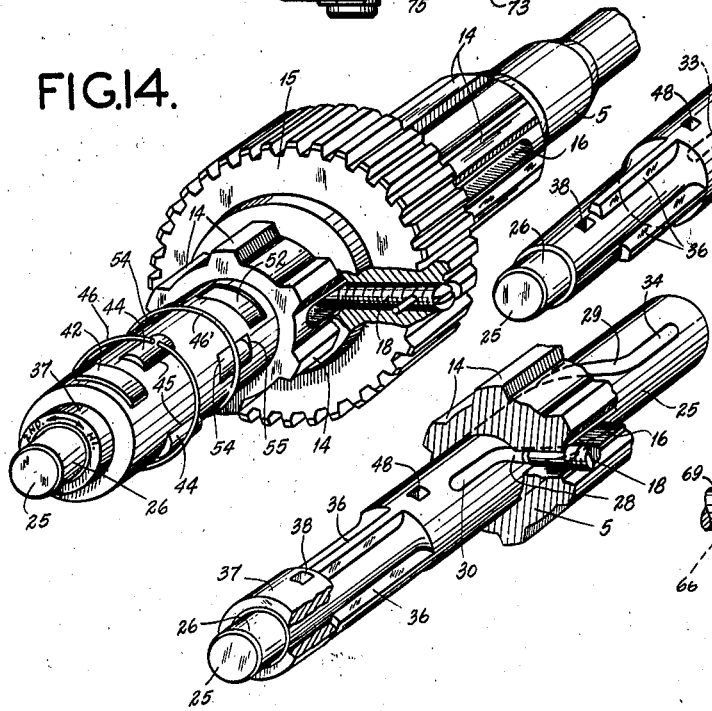
FIG.14. FIG.15. FIG.16. FIG.17.
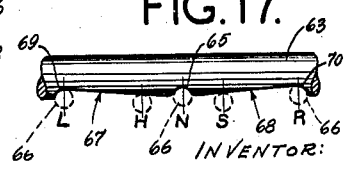
INVENTOR:
GLENN T. RANDOL,
BY P. H. Lamphere
ATTORNEY.

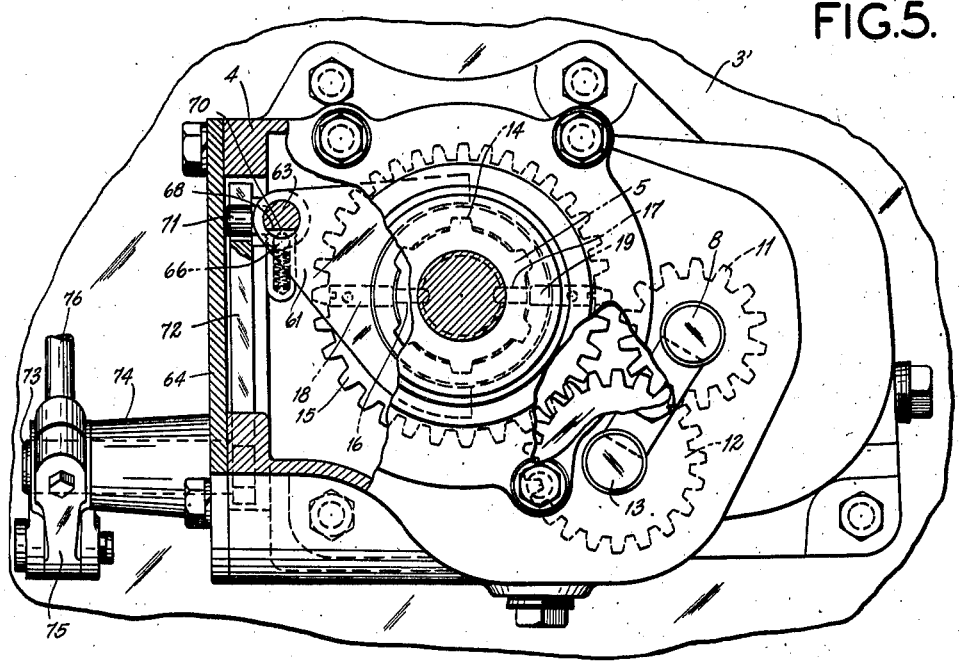
FIG.5.
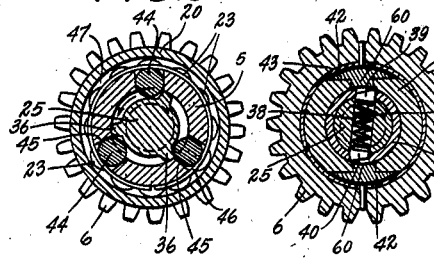
FIG.6.  FIG.7.  FIG.8.  FIG.9.
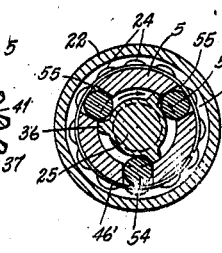
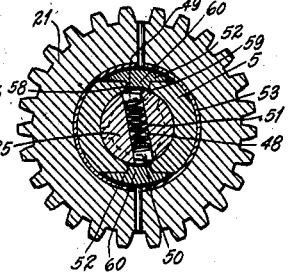
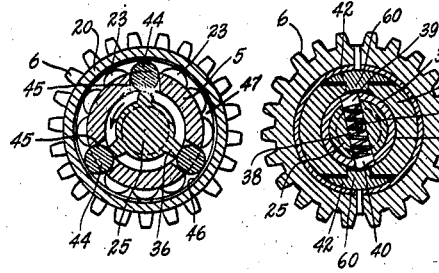
FIG.10.  FIG.11.  FIG.12.  FIG.13.
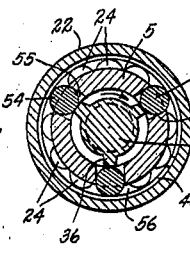
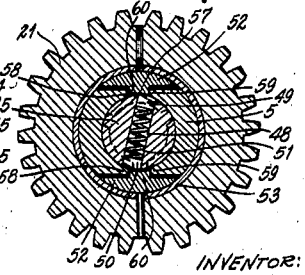
INVENTOR:
GLENN T. RANDOL,
BY P. H. Lamphere
ATTORNEY.

Patented May 16, 1944

2,348,753

UNITED STATES PATENT OFFICE 2,348,753

CHANGE SPEED TRANSMISSION

Glenn T. Randol, St. Louis, Mo., assignor of forty per cent to William M. Liddon, Nashville, Tenn.

Application December 28, 1940, Serial No. 372,047

11 Claims. (Cl. 192—53)

My invention relates to change speed transmissions and more particularly to improved means for causing different gear ratios to be operative.

One of the objects of my invention is to produce a change speed transmission having embodied therein improved clutch means and operating means therefor for causing a gear ratio to be operative without injury to the parts regardless of the speed of the vehicle.

Another object of my invention is to produce a combined positive clutch means and synchronizing means therefor for quietly and smoothly connecting two rotatable elements together which can be caused to be first operable and then inoperable by a member movable in either direction between two positions.

Still another object of my invention is to provide an improved positive clutch means of the type embodying radially movable elements with associated synchronizing means for connecting two rotative elements together.

A further object of my invention is to produce an improved change speed transmission in which the different forward and reverse gear ratios can be obtained by a single movable member movable in opposite directions from a central or neutral position.

Yet another object of my invention is to produce a change speed transmission of the kind above referred to which is so constructed that it can be controlled by a single shifting lever movable in a single plane and in such a manner that the conventional H-slot shifting arrangement can be retained without the necessity of complicated linkage construction between the shifting lever and the gearing and also be well adapted for use on motor vehicles as now on the market and which lends itself to ready installation in place of conventional equipment.

Other objects of my invention will become apparent from the following description taken in connection with the accompanying drawings in which Figure 1 is a partial sectional side view of a change speed transmission embodying my invention, the parts being in neutral position; Figure 2 is a perspective view showing the shifting handle and the manner in which it is associated with the steering column and wheel; Figure 3 is a sectional view taken on the line 3—3 of Figure 2; Figure 4 is a partial sectional top view of the change speed transmission with parts shown in high speed position; Figure 5 is a rear end view of the change speed transmission; Figures 6, 7, 8 and 9 are sectional views taken on the lines 6—6, 7—7, 8—8 and 9—9 of Figure 1, showing the positive clutch and synchronizing means therefor in neutral positions; Figures 10 and 11 are sectional views taken on the lines 10—10 and 11—11 of Figure 4, showing the parts in operative high speed position; Figures 12 and 13 are sectional views similar to Figures 8 and 9 but showing the parts in operative second speed position; Figure 14 is a perspective view of the transmission driven shaft and the structure carried thereby; Figure 15 is a perspective view of the rotatable shifting member positioned in the driven shaft; Figure 16 is another view of the rotatable shifting member showing how certain parts are associated therewith; Figure 17 is a view showing the rail in the transmission casing upon which is slidable the single shifting fork; and Figure 18 is an enlarged view of one end of the synchronizer operating plungers and associated parts.

I have illustrated the transmission embodying my invention as being associated with an automobile but it is to be understood that it may be used wherever a change speed transmission is desirable. In Figure 1 the engine 1 is connected to the drive shaft 2 of the change speed transmission through the usual clutch (not shown) actuated by clutch pedal 3 and positioned in the clutch housing 3'. To this clutch housing is secured the casing 4 of the change speed transmission. The driven shaft 5 of the transmission is connected in the usual manner through differential gearing to the wheels of the vehicle. This driven shaft is of hollow construction and extends into the transmission housing to a point adjacent the drive shaft 2 where it is piloted in the gear 6 integral with the driving shaft 2. The gear 6 is in constant mesh with a gear 7 of a cluster of gears rotatably mounted on a countershaft 8 having bearings in the housing and positioned parallel to the axially aligned drive and driven shafts. In addition to gear 7, the cluster of gears also consists of a second speed gear 9, a low speed gear 10 and a reverse gear 11, the latter being in constant mesh with an idler gear 12 mounted on a stub shaft 13.

As best shown in Figure 14, the rear portion of the driven shaft 5 is provided with external splines 14 upon which is slidably mounted a combined low and reverse gear 15 for continuous rotation with the driven shaft. The splined portion of the driven shaft is also provided with opposed axially extending slots 16 and 17 which receive, respectively, pins 18 and 19 carried by gear 15, said pins being of such length as to project slightly within the hollow portion of the driven shaft.

The forward end portion of the driven shaft ahead of the splines is of smooth construction and extends into an integral annular flange 20 on gear 6. Between gear 6 and the splines is a second speed gear 21 rotatably mounted on the smooth portion of the driven shaft and constantly meshing with gear 9 on the counter shaft. This gear 21 has a forwardly extending annular flange 22 which abuts the flange 20 of gear 6. The flange 20 is provided with a plurality of recesses 23 on its inner surface (see Figures 6 and 10) and flange 21 has similar recesses 24 on its inner surface (see Figures 8 and 12).

Within hollow portion of the driven shaft is a clutch actuator shaft 25 (Figures 15 and 16) which is capable of relative rotation only with respect to said driven shaft. The forward end of this actuator has a reduced portion 26 which is piloted in a bearing 27 positioned in driving shaft 2. The rear portion of the clutch actuator shaft is of cylindrical form and its surface is provided with two grooves 28 and 29, the former receiving the end of pin 18 and the latter the end of pin 19, previously referred to. The groove 28 has straight portions 30 and 31 on opposite sides of the shaft which are interconnected by a curved portion 32. Similarly, the groove 29 has straight portions 33 and 34 on opposite sides of the shaft which are interconnected by a curved portion 35. The straight portions 30 and 33 are at one end of the cylindrical portion of the shaft and the straight portions 31 and 34 are at the opposite ends. By this construction it is seen that by moving gear 15 forward from its central or neutral position, as shown in Figure 1, the clutch actuating shaft 25 can be rotated approximately 60 degrees in a clockwise direction (Figure 14) relative to the driven shaft and if said gear is moved rearwardly, shaft 25 can be rotated approximately 60 degrees in a counterclockwise direction relative to the driven shaft.

The forward end of the clutch actuating shaft 25 is formed with three ribs 36 spaced 120 degrees apart and between these ribs and the portion 26 is a collar 37 shrunk onto the shaft, said collar being of a diameter equal to that of the cylindrical portion 25. This collar and the piloted portion 26 support the forward end of the driven shaft. Extending through the collar and the clutch actuating shaft is a square hole 38 in which is positioned plungers 39 and 40 having interposed therebetween a spring 41. These plungers, under certain conditions, are adapted to engage with synchronizing shoes 42 carried by the forward end of the driven shaft and cause them to frictionally engage with a ring 43 secured to the inner surface of gear 6. The shoes and ring are made of bronze or some equivalent material. The forward end of the driven shaft also carries three rollers 44 positioned in three slots 45 in the shaft spaced 120 degrees apart. These rollers are normally biased by a split spring ring 46 in order to project into the hollow part of the driven shaft where they can be engaged by the ribs 36 when the clutch actuating shaft is rotated in a counterclockwise direction, as indicated by the arrow in Figures 6 and 10. The ring 46 lies within a groove 47 in flange 20. When the clutch actuating shaft 25 is rotated to move the rollers outwardly, the spring will expand and each roller will project up above the surface of the driven shaft and engage with a recess 23 in said flange to thereby connect gear 6 to the driven shaft so that power can be transmitted directly from the drive shaft 2 to driven shaft 5.

The clutch actuating shaft 25 at a point just rearwardly of the ribs 36 is provided with a second square hole 48 in which is positioned plungers 49 and 50 having interposed therebetween a spring 51. These plungers are adapted under certain conditions to cooperate with synchronizing shoes 52 carried by driven shaft 5 and lying beneath gear 21. A cooperating friction ring 53 is secured to gear 21. The driven shaft just forward of the synchronizing shoes 52 carries three rollers 54 lying in slots 55 spaced 120 degrees apart in the driven shaft. These rollers are normally held in their inner position by a spring ring 46' where they project into the hollow portion of the driven shaft. In these positions the rollers can be engaged by ribs 36 when clutch actuating shaft 25 is rotated in a clockwise direction (Figures 8 and 12) and be forced outwardly and into a recess 24 in flange 22 of gear 21 and thus connect said gear to the driven shaft. The spring ring lies in a groove 56 in said flange 22. It is to be noted that the rollers 54 are staggered with respect to rollers 44 associated with gear 6, this staggering relation being such that when the clutch actuating shaft 25 is in its neutral position where all the rollers are held inwardly, the ribs on the clutch actuating shaft lie on one side of rollers 44 and on opposite sides of rollers 54.

As best shown in Figure 18 wherein is disclosed an enlarged view of one of the plungers, namely, plunger 49, and the related structure (the other plungers have the same construction), said plunger is provided with a rounded nose 57 and the edges 58 and 59 adjacent the inwardly projecting portion 60 of the synchronizing shoes are all rounded in order to facilitate the disengagement of said plunger from the shoe when the clutch actuating shaft is rotated to such a position to bring the plunger from a position beneath the shoe to a position engaging the inner surface of the driven shaft. In the inoperative or neutral position of the clutch actuating shaft all the plungers will be in engagement with the inner surface of the driven shaft and out of engagement with the synchronizing shoes which they are adapted to actuate. This condition is shown in Figures 7 and 9 which is the inoperative or neutral position of the clutch actuating shaft. The plungers are so related to each other that when the shaft is turned in a counter-clockwise direction, plungers 39 and 40 will become operative to position the synchronizing shoes outwardly and plungers 49 and 50 will remain inoperative, since they continue to engage with the inner surface of the driven shaft. When the clutch actuating shaft is turned in the opposite direction, plungers 49 and 50 will become operative to position the synchronizing shoes 52 outwardly and plungers 39 and 40 will remain inoperative. The synchronizing shoes will become operative before ribs 36 actuate the rollers since the ribs in their neutral position are spaced slightly away from the rollers and do not engage said rollers until the corresponding synchronizer shoes are operated when shaft 25 is rotated.

The means for moving gear 15 and rotating the clutch actuating shaft 25 comprises a shifting fork 61 having a cylindrical portion 62 slidably mounted on a rod 63 carried on the side of the casing adjacent the closure plate 64. This rod, as shown in Figure 17, is provided with a recess 65 for cooperation with a detent 66 carried by the cylindrical portion 62 (see Figure 1). This detent, when in recess 65, determines the neutral position of the change speed transmission. The rod 63 on each side of the recess 65 is formed with inclined surfaces 67 and 68 and at the ends of these surfaces are shoulders 69 and 70 against which the detent 66 is adapted to abut and thus determine the low and reverse positions of the transmission which are the extreme positions that gear 15 can be shifted in opposite directions from its neutral position.

The cylindrical portion 62 is also provided with a lug 71 which is received in the forked end of an arm 72 secured to a stub shaft 73 mounted in a bearing 74 of the cover plate and extending to the exterior of the housing. The outer end of shaft 73 has secured thereto another lever 75 for rotating said shaft and lever 72 to move the shifting fork in opposite directions. Connected to lever 75 is a rod 76 which extends forwardly and upwardly to where it is connected to an arm 77 secured to a shaft 78. This shaft 78 is mounted on the steering column 79 of the automobile and extends parallel to the column. The lower end of the shaft has bearing in a bracket 80 secured to the lower portion of the steering column and the upper end has bearing in a bracket 81 secured to the upper portion of the steering column just beneath the steering wheel 82.

The bracket 81 has a plate portion 83 in which is cut an H-slot 84. Beneath plate 83 and secured to shaft 78 is a cylindrical extension 85 which receives a shifting handle 86 having a projection 87 extending through a slot 88 in the cylindrical portion and cooperating with the H-slot in the plate, said extension and H-slot cooperating to limit the rotative movement of the handle to that required to shift the parts to obtain different speed ratios and also to provide definite positions for the different operative positions of the transmission. The handle 86 is biased outwardly by a spring 89 whereby the projection 87 will normally lie in the portion of the H-slot designated by the letters "S" and "H" and indicating the second and high speed positions, respectively, of the transmission. These legs of the H-slot are shorter than the other legs designated by the letters "L" and "R" and corresponding to the low and reverse speeds of the transmission. Thus when projection 87 is in the portion of the H-slot corresponding to the second and high speed positions, handle 86 is capable of rotating shaft 78 through a smaller angle than when the projection is in the low and reverse portion of the H-slot. In order to put projection 87 in alignment with the low and reverse portions of the H-slot the handle need only be pushed axially inwardly by a finger of the operator when the pin coincides with the cross-over portion of the H-slot, said position corresponding to the neutral position of the change speed gearing as designated by the letter "N" on plate 83 (shown in Figure 2).

In the operation of my improved change speed transmission and the control means therefor, the neutral or inoperative position of the parts are as shown in Figure 1. Under these conditions the handle 86 will be in such position that projection 87 will lie in the center of the "S" and "H" slots and in the position marked "N." The sliding gear 15 of the change speed gearing will be centrally located on the splined portion of the driven shaft and half-way between the low speed countershaft gear 10 and reverse idler gear 12. The detent 65 of the shifting fork 61 will engage in the recess 65 of the supporting rail 63.

If it is desired to place the transmission in low speed, the main clutch controlled by the clutch pedal 3 is disengaged and handle 86 moved axially toward the steering column to place projection 87 in alignment with the legs of the slot marked "L" and "R." The handle is then pulled downwardly so that the projection 87 will move to the end of the slot marked "L." The swinging of the handle downwardly in the plane of the steering wheel will cause rotation of the shaft 78 and by means of the rod 76 and lever 75 and 72 cause the shifting fork 61 to be moved forwardly or to the left, as shown in Figures 1 and 4, and to a position where gear 15 engages gear 10 on the countershaft to thereby connect the countershaft to the driven shaft through said gears. Since the driving shaft 2 is continuously connected by gears 6 and 7 to said countershaft, power can then be transmitted from driving shaft 2 to driven shaft 5 and then to the wheels of the vehicle when the main clutch is engaged.

As gear 15 is moved forwardly, pins 18 and 19 carried thereby and extending into grooves 28 and 29 will cause relative rotation of the clutch actuating shaft 25 in a clockwise direction, as viewed in Figure 14. Because of the curved portions 32 and 35 of the grooves, the rotation of the clutch actuating shaft will take place prior to engagement of gear 15 with gear 10 and the extent of this rotation will be approximately 60 degrees. When gear 15 begins to engage gear 10, there will be no rotation of shaft 25 due to the straight portions 30 and 33 of the grooves. The rotation of the shaft 25 will first cause plungers 39 and 40 (see Figures 7 and 11) to be moved to a position where they can act on the synchronizing shoes 42 and thus force these shoes outwardly into frictional engagement with the ring 43 carried by gear 6. If the vehicle is stationary, as will be the case if the vehicle is to be started from a stopped position, the driving shaft 2 and the driven shaft 5 will both be stationary due to the fact that the main clutch is disconnected from the engine. Therefore, no synchronizing action will take place. The rotation of the clutch actuating shaft 25 to cause plungers 39 and 40 to act on the synchronizing shoes will be such as to bring ribs 36 into engagement with rollers 44. Continued rotation of the clutch actuating shaft will now cause rollers 44 to be shoved radially outwardly and into a recess 33 to thereby connect the driving shaft to the driven shaft. When this connection takes place, gear 15 has reached the point indicated in Figure 4. This is high gear position of the parts. As the gear is moved farther forward to engage gear 10, the clutch actuating shaft will continue to rotate in a clockwise direction, as seen in Figure 14, or a counter-clockwise direction as viewed in Figures 6 and 10. The ribs thus beyond the rollers will permit these rollers to become disengaged from recesses 23 under the action of the spring ring 46. The driven shaft will then be disconnected from the driving shaft and as this takes place, gear 15 will reach the position where it begins to engage with gear 10. The clutch actuating shaft will no longer be rotated as the gears are brought into full engagement due to the fact that pins 18 and 19 are now in the straight portions 30 and 33 of the grooves.

If the transmission is in low speed position and it is desired to place it in second speed position, the main clutch is disengaged and then the gear shifting handle is brought back to the cross slot of the H-slot and the projection 87 allowed to become aligned with the "S" leg of the H-slot.

This will result in gear 15 being disengaged from the countershaft gear 10 and moved back to its neutral position. As soon as gear 15 becomes disengaged from gear 10, pins 18 and 19 will cause the clutch actuating shaft 25 to be rotated in a counter-clockwise direction (Figure 14) thereby actuating the synchronizing shoes 42, engaging rollers 44 with recesses 23, and then permitting their disengagement therefrom as a result of continued rotation of said shaft. Because the synchronizer action becomes operative before the rollers are moved outwardly by ribs 36, there will be no difficulty in engaging the rollers, notwithstanding that the driven shaft and the driving shaft may be rotating at different speeds when gears 15 and 10 are disengaged. The synchronizing action is sufficient to bring the driving and driven shafts to approximately equal speeds at the time that the rollers are moved outwardly to engage the recesses 23.

After gear 15 has been brought back to its central position by the movement of the handle 86, the handle is then moved upwardly in a plane parallel to the plane of the steering wheel so that the projection 87 goes to the end of the portion of the slot marked "S." This will cause gear 15 to move rearwardly or to the right, as viewed in Figures 1 and 4. The pins, by means of grooves 28 and 29, will continue to rotate the clutch actuating shaft in a counter-clockwise direction as viewed in Figure 14, the extent of relative rotation being approximately 60 degrees. This rotation of the shaft will move it from the position shown in Figures 8 and 9 to the position shown in Figures 12 and 13. The first part of the rotation will cause the plungers 49 and 50 to assume a position where they can apply pressure to the synchronizing shoes 52. After this occurs, the ribs 36 will then engage the rollers 54 and force them outwardly into a recess 24 and thus cause second speed to be operative when the main clutch is engaged. The engagement of the synchronizing shoes with gear 21 will cause this gear to rotate with substantially the same speed as the driven shaft and when the rollers are forced outwardly, they will easily engage their recesses and thus permit the rollers to engage smoothly.

If it is desired to place the transmission in high speed position, the main clutch is disengaged and then handle 86 is pulled downwardly so that the projection 87 is moved to the end of the slot marked "H" as shown in dotted lines in Figure 2. This will now cause gear 15 to be moved from the position where second speed is engaged to the position where high speed is engaged. The high speed position of the levers 75 and 72 employed in moving gear 15 is shown in dotted lines in Figure 1. The movement of this gear will, by means of pins 18 and 19, cause relative rotation of the clutch engaging shaft through an angle of approximately 120 degrees in a clockwise direction (Figure 14). The ribs 36 will thus be moved from beneath the rollers 54 permitting their disengagement and then moved into the position shown in Figure 10 wherein rollers 44 will be moved out into the recesses 23 and connect the driving and driven shafts together for direct drive when the main clutch is engaged. Prior to the movement of these rollers 44 outwardly, plungers 39 and 49 will become operative to move the synchronizing shoes 42 outwardly and cause the driving shaft to be brought into substantial synchronous speed with the driven shaft whereby said rollers can be easily engaged as already described. The high speed position of the parts is shown in Figures 4, 10 and 11.

If reverse speed is desired at any time, the main clutch is disengaged and then the gear shifting handle 86 is first moved axially and then upwardly so that the projection 87 is at the end of the slot marked "R." This will cause gear 15 to be moved rearwardly to engage the idler gear 12. During this movement the clutch engaging shaft 25 will be rotated in a counter-clockwise direction (Figure 14) by means of the pins 18 and 19 so as to cause first the operation of the synchronizing friction shoes 52, the engagement of the rollers 54 with their recesses, and then permit their disengagement, all prior to the engagement of the gear 15 with the idler gear 12. Since reverse gear is generally selected when the automobile is at a standstill, the synchronizing friction shoes 52 will not perform any work as the gear 21 and driven shaft 5 are stationary.

In the operation of the transmission just described, it is seen that in order to obtain low speed ratio it is necessary to cause engagement and disengagement of the high speed ratio and to obtain reverse gear ratio it is necessary to cause engagement and disengagement of the second speed ratio. This, however, is not a disadvantage since it is very easy to "pass through" the second and high speed ratios due to the fact that the synchronizing means employed with each set of clutch rollers is operative in both directions of rotation of the clutch actuating shaft. In other words, the synchronizing means permits synchronization before clutch engagement when the clutch actuating shaft is rotated in one direction to cause clutch engagement and then disengagement and also permits synchronization before clutch engagement when said shaft is rotated in the reverse direction. The arrangement also has many advantages in normal operation of an automobile since the second and high speed gear ratios are employed to a greater extent than the other gear ratios, low speed gear being used only in starting the vehicle from a standstill or in going up a heavy grade. To obtain either second or high, it is only necessary to shift the shifting handle 86 back and forth in a plane parallel to the steering wheel. When the handle is moved upwardly, the clutch engaging shaft is rotated to engage the second speed gear after first causing said gear, by means of the synchronizing means, to be brought to substantially the same speed as the driven shaft. When the handle is moved downwardly, the clutch engaging shaft is rotated in the opposite direction to cause the driving shaft to be directly connected to the driven shaft. The projection 87 on the gear shifting handle is normally positioned in alignment with the "S" and "H" slots and, therefore, it is not necessary to axially move the gear shifting handle at any time except when it is desired to place the transmission either in low or reverse speed. The arrangement also permits a simplified connection between the gear shifting handle and the gear box as all shifting takes place by a back and forth movement, there being no necessity for a "cross-over" as is present standard practice.

The change speed transmission is very compact in arrangement and permits easy selection of the different speeds. Any speed can be selected and engaged at any time. The clutch engaging shaft operates the clutch rollers only by a rotative movement, there being no necessity for longitudinally shifting this shaft. The arrangement of the clutch rollers is such that little synchronizing action is required for their engagement since they are positioned close to the axis of rotation where the differences in linear speeds are not great. Also the clutch roller mechanism permits the use of a light detent spring since the axial power thrust through the transmission cannot cause the clutch rollers to slip or jump out of engagement and this materially reduces the manual effort required to render either second or high speed ratio operative or inoperative.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a transmission mechanism, a driving member, a driven member, one of said members being provided with a recess, a radially movable clutch element carried by the other of said members and adapted to engage the recess of the first named member to lock said members together, an actuating member mounted on the member carrying the clutch element for relative rotation thereto on the same axis and provided with means to radially move the clutch element into the recess when rotated relatively to the clutch carrying member, means for frictionally connecting the driving and driven members, and means operable by a rotation of the actuating member prior to the movement of the radially movable clutch element for operating said frictional connection.

2. In a transmission mechanism, a driving member, a driven member, one of said members being rotatable around the other member and provided with a recess, a clutch element carried by the other of said members and adapted to be moved radially to engage the recess of the first named member to lock said members together, an actuating member mounted in the member carrying the clutch element and fixed against relative longitudinal movement but rotatable relative thereto on the same axis to radially move the clutch element into the recess, means including a movable member carried by said other member for frictionally connecting the driving and driven members, and means operable by the rotatable actuating member for operating said movable member of the frictional connection to produce a synchronizing action prior to the movement of the clutch element radially.

3. In a transmission, a rotatable hollow shaft, a member rotatable thereon and provided with recesses adjacent the surface of the shaft, a circular clutch element carried in an opening in the wall of the shaft beneath the member, free to rotate therein and capable of being moved radially outwardly to engage with a recess in the member, a rotatable actuating element positioned in the hollow shaft and fixed against relative longitudinal movement, said element carrying a part for engaging the clutch element to force it outwardly, and means shiftable axially of the shaft for rotating said actuating element.

4. In a transmission, a rotatable hollow shaft, a member rotatable thereon and provided with recesses adjacent the surface of the shaft, a circular clutch element carried in an opening in the wall of the shaft beneath the member, free to rotate therein about its own axis and capable of being moved radially outwardly to engage with a recess in the member, a rotatable actuating element positioned in the hollow shaft and fixed against relative longitudinal movement, said element carrying a part for engaging the clutch element to force it outwardly, a friction member carried by the shaft and movable outwardly to engage the rotatable member, means carried by the rotatable actuating element for operating the friction member prior to movement of the clutch element outwardly when said rotatable element is rotated, and means shiftable axially of the shaft for rotating said actuating element.

5. In a transmission, a rotatable hollow shaft, a member rotatable thereon and provided with a recess adjacent the surface of the shaft, a circular clutch element carried in an opening in the wall of the shaft beneath the member, free to rotate thereon about its own axis and capable of being moved radially outwardly to engage a recess in the member, a rotatable actuating element positioned in the hollow shaft and fixed against relative longitudinal movement, said element carrying a part for engaging the clutch element to force it outwardly, said part being capable of passing beneath said clutch element from an inoperative position on one side thereof to an inoperative position on the other side thereof as the element is rotated, and means for rotating said rotatable actuating element in opposite directions.

6. In a transmission, a rotatable hollow shaft, a member rotatable thereon and provided with a recess adjacent the surface of the shaft, a circular clutch element carried in an opening in the wall of the shaft beneath the member, free to rotate thereon about its own axis and capable of being moved radially outwardly to engage a recess in the member, a rotatable actuating element positioned in the hollow shaft and carrying a part for engaging the clutch element to force it outwardly, said part being capable of passing beneath said clutch element from an inoperative position no one side thereof to an inoperative position on the other side thereof as the element is rotated, means for rotating said actuating element in opposite directions, synchronizing means including cooperating friction surfaces carried by the shaft and the rotatable member, and means carried by the actuating element for operating the synchronizing means, said last named means being operable in both directions of rotation of the actuating element to cause the synchronizing means to function prior to movement of the clutch element into operative position.

7. In a transmission mechanism, a hollow shaft, a member rotatable thereon and provided with recesses and a friction surface adjacent the external surface of the shaft, radially movable clutch elements carried in openings in the wall of the shaft and adapted to be moved outwardly to engage said recesses and lock the shaft and member together, a movable friction member carried by the shaft and adapted to be moved into engagement with the friction surface of the rotatable member, an actuating member positioned in the hollow shaft for relative rotation thereto, means carried by said actuating member for first actuating the movable friction member and then the clutch element as the actuating member is rotated, and means for rotating the actuating member.

8. In a transmission mechanism, a hollow shaft, a member rotatable thereon and provided with recesses and a friction surface adjacent the external surface of the shaft, radially movable clutch elements carried in openings in the wall of the shaft and adapted to be moved outwardly to engage said recesses and lock the shaft and member together, a movable friction member carried by the shaft and adapted to be moved into engagement with the friction surface of the rotatable member, an actuating member positioned in the hollow shaft for relative rotation thereto, means on said actuating member for engaging and moving the clutch elements outwardly into the recesses when the actuating member is rotated, a spring-operated plunger carried by the actuating member for engaging and operating the movable friction member, said spring plunger and the means for moving the clutch elements being so related that the former will be caused to be operative prior to the latter when the actuating member is rotated, and means for rotating said actuating member.

9. In a transmission mechanism, a hollow shaft, a member rotatable thereon and provided with recesses and a friction surface adjacent the external surface of the shaft, radially movable clutch elements carried in openings in the wall of the shaft and adapted to be moved outwardly to engage said recesses and lock the shaft and member together, a movable friction member carried by the shaft and adapted to be moved into engagement with the friction surface of the rotatable member, an actuating member positioned in the hollow shaft for relative rotation thereto, and independent means carried by said actuating member and so related to each other and the clutch elements and friction member that the friction member will be operated prior to the clutch elements when the actuating member is rotated in one direction to cause the clutch elements to be operative and then inoperative or in the return direction of rotation to also cause the clutch elements to be operative and then inoperative.

10. In a transmission mechanism, a hollow driven member, two driving members mounted thereon and each provided with recesses, radially movable clutch elements carried by the driven member for engaging the recesses and locking the driving members to the driven member, a rotatable actuating member positioned in the hollow driven member, and means carried by the actuating member for causing certain of the clutch elements to engage recesses in one driving member when the said actuating member is rotated in one direction from a predetermined position and other means carried by the actuating member for causing certain other of the clutch elements to engage recesses in the other driving member when the actuating member is rotated in the opposite direction from said predetermined position.

11. In a transmission mechanism, a hollow driven member, two driving members mounted thereon and each provided with recesses, radially movable clutch elements carried by the driven member for engaging the recesses and locking the driving members to the driven member, a rotatable actuating member positioned in the hollow driven member, means associated with each driving member and the driven member for frictionally connecting the former to the latter, and means carried by the actuating member for successively operating the friction member and the clutch elements associated with one driving member when said actuating member is rotated in one direction from a predetermined position and for successively operating the friction member and the clutch elements associated with the other driving member when said actuating member is rotated in the opposite direction from said predetermined position.

GLENN T. RANDOL.